J. J. LINDEN.
PIE CRUST TRIMMING MACHINE.
APPLICATION FILED DEC. 31, 1920.
1,384,907.
Patented July 19, 1921.
3 SHEETS—SHEET 2.
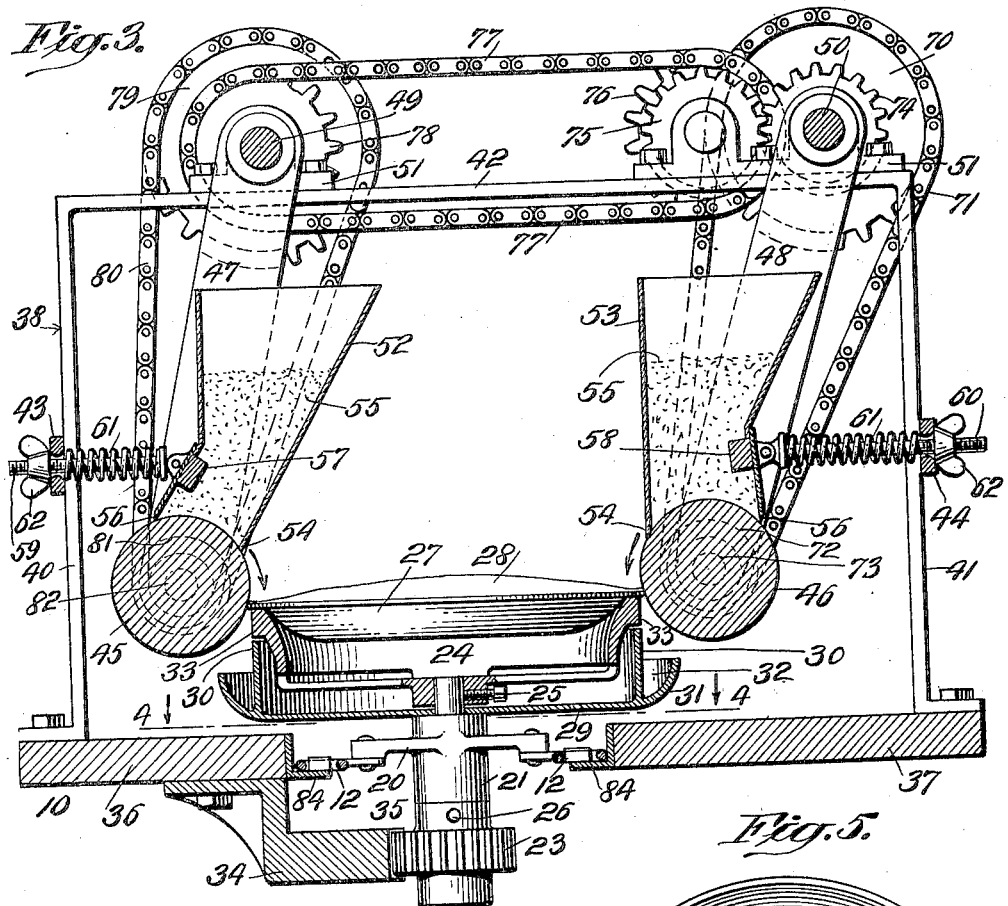
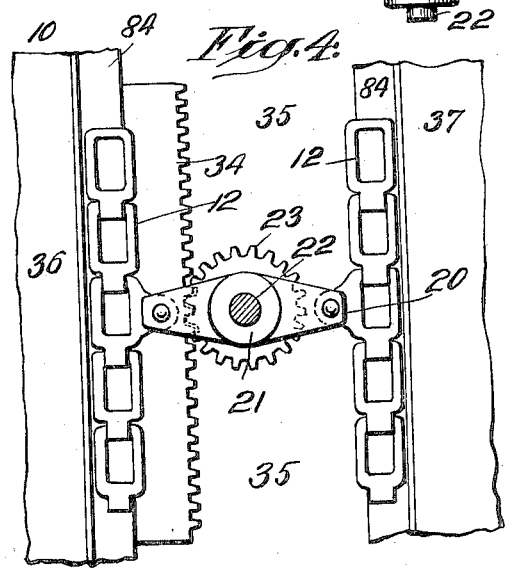
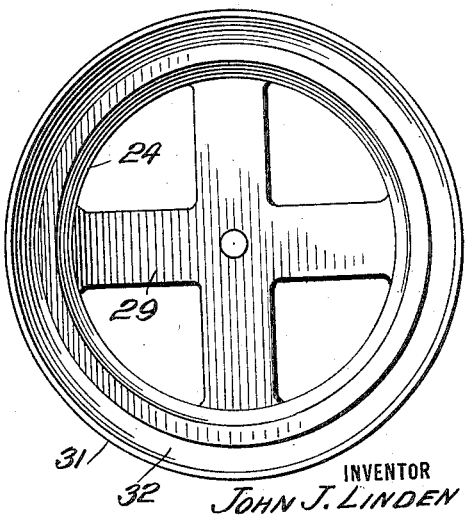
INVENTOR
JOHN J. LINDEN
BY
ATTORNEY

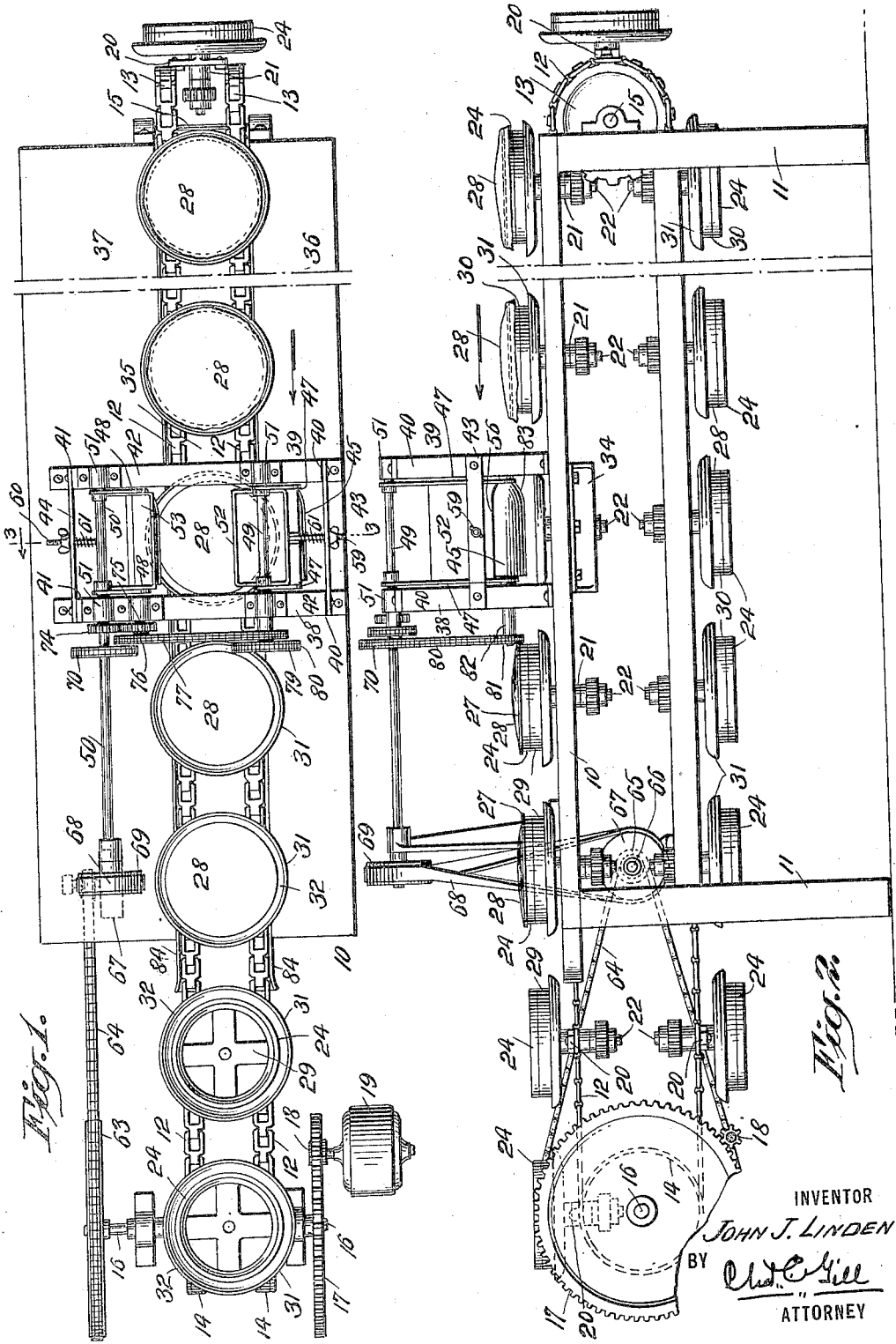

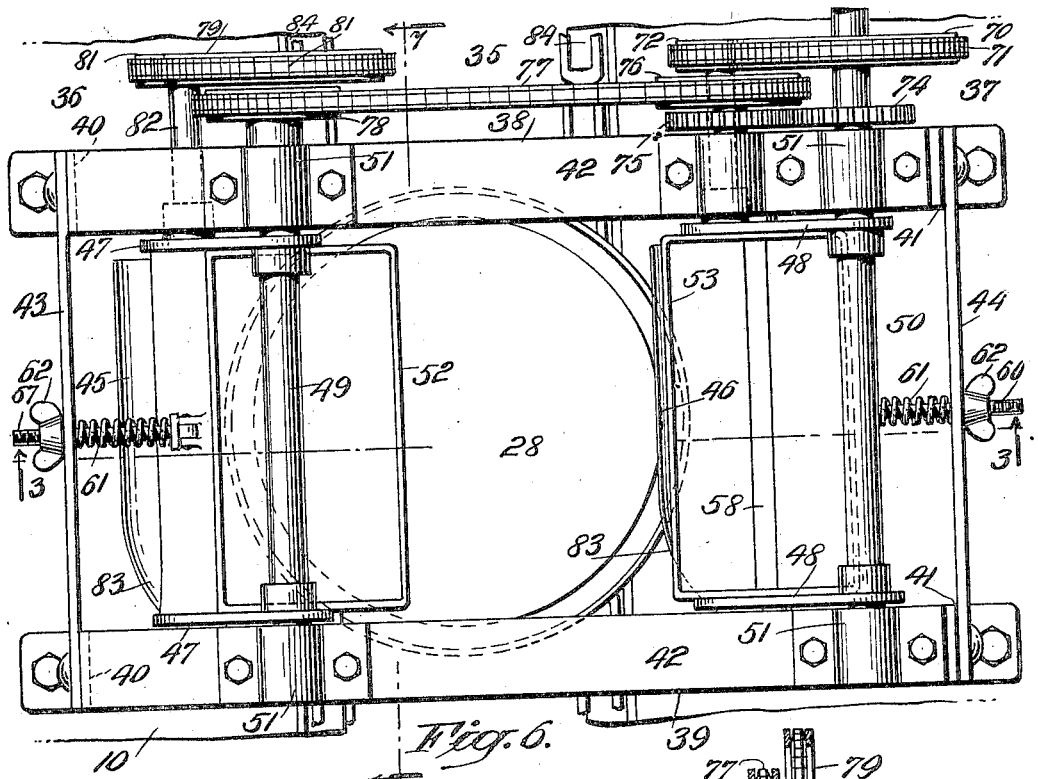
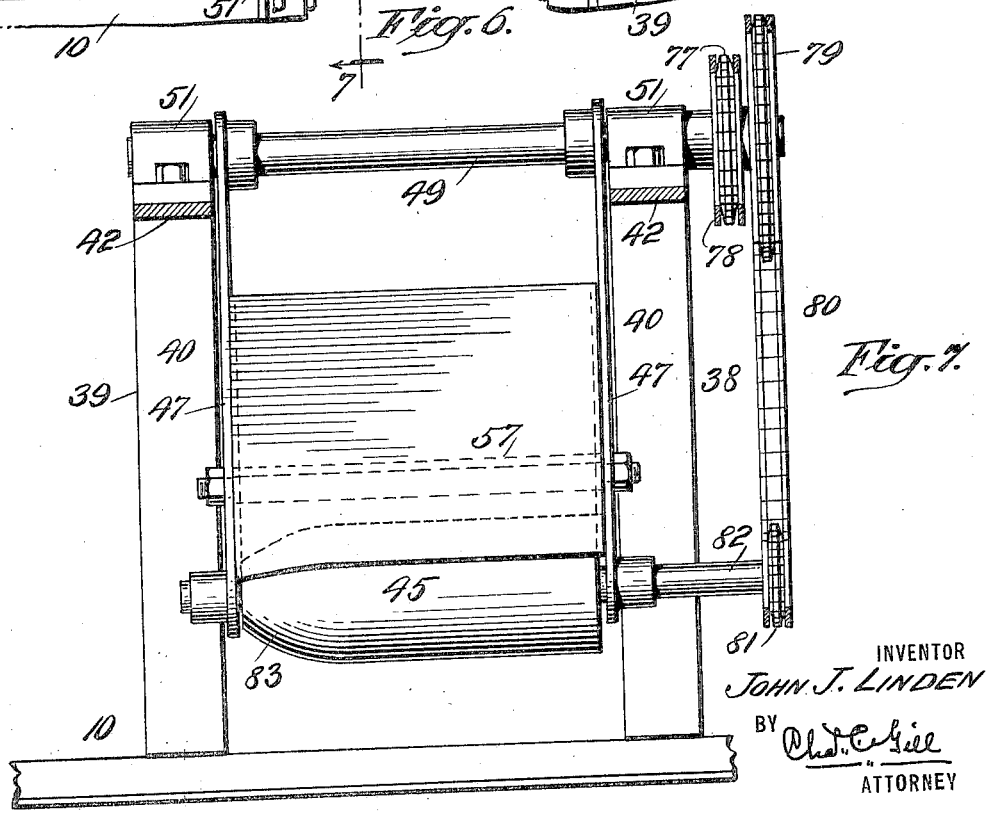

UNITED STATES PATENT OFFICE.

JOHN J. LINDEN, OF JERSEY CITY, NEW JERSEY, ASSIGNOR TO BENJAMIN B. VANDER VEER, OF NEW YORK, N. Y.

PIE-CRUST-TRIMMING MACHINE.

1,384,907.  Specification of Letters Patent.  Patented July 19, 1921.

Application filed December 31, 1920. Serial No. 434,205.

*To all whom it may concern:*

Be it known that I, JOHN J. LINDEN, a citizen of the United States, and a resident of Jersey City, in the county of Hudson and State of New Jersey, have invented certain new and useful Improvements in Pie-Crust-Trimming Machines, of which the following is a specification.

The invention pertains to machines for trimming off the surplus portion of the crust of pies along the rim or outer edge of the pie-tins, and one object of the invention is to provide a machine which shall be efficient for the purpose mentioned, rapid and automatic in operation, self-adjusting to irregularities and variations along the edges of the pies and their tins and lacking in complexity.

In accordance with my invention the pies while held in suitable supports are carried along by an endless conveyer and during a predetermined portion of their line of travel are rotated about their vertical axes and while rotating are moved between and along a pair of horizontal power driven rollers which rotate in a direction toward each other and carry their surfaces downwardly against the projecting or overhanging portions of the dough or crust of the pies as the pies are carried along between and rotated against them, with the result that the rollers trim off and move downwardly the surplus dough at the rim of a pie very efficiently and rapidly and during only a short longitudinal travel of the pie. The rollers by acting downwardly against opposite edges of the pie avoid any tilting of the pie and hold the pie firmly on its support while trimming off the surplus crust therefrom. The rotation of the pie while traveling between and against the pair of rollers, assures the correct trimming off of the surplus crust along the entire periphery of the pie.

The invention will be fully understood from the detailed description hereinafter presented, reference being had to the accompanying drawings, in which:

Figure 1 is a top view, partly broken away, of a pie-crust trimming machine constructed in accordance with and embodying the invention;

Fig. 2 is a side elevation, partly broken away, of the same;

Fig. 3 is a vertical transverse section, on a larger scale, through a portion of the machine, taken on the dotted line 3—3 of Fig. 6, and illustrating the parts of the machine in operation, a pie being shown as carried between and acted on by the pair of trimming rollers;

Fig. 4 is a horizontal section, partly broken away, through the same, taken on the dotted line 4—4 of Fig. 3;

Fig. 5 is a detached top view of one of the supporting frames carried by the endless chains and adapted to receive and carry the pie tins, with their contents, between and against the trimming rollers;

Fig. 6 is a top view, partly broken away, of that portion of the machine illustrated in transverse section in Fig. 3, and Fig. 7 is a vertical section through the same, taken on the dotted line 7—7 of Fig. 6.

In the drawings, 10 designates a suitable table mounted on legs 11 and adapted to support the main operative parts of the machine.

12, 12 designate two parallel endless conveying chains adapted to travel lengthwise of the table 10 and supported on sprocket wheels 13, 14 which are respectively mounted on transverse shafts 15, 16, respectively, the shaft 16 being the drive shaft and being connected by a large gear-wheel 17 thereon with a pinion-wheel 18 secured on the shaft of a suitable motor 19, from which power is imparted to the shaft 16.

The sprocket-chains 12 are connected together at suitable intervals by transverse bars 20 (Figs. 3 and 4) secured to the links thereof and having central tubular sleeve portions 21 through which vertical shafts 22 extend, said shafts having on their lower ends gear-wheels 23 and on their upper ends circular pie-tin supporting frames 24. The frames 24 are fixed to the shafts 22 by means of screws 25 and the gear-wheels 23 are pinned to the shafts 22 by means of pins 26 and thus when the gear-wheels 23 are rotated, the shafts 22 will receive corresponding motion and impart rotary movement to the supporting frames 24 and the pies carried by them, a pie-tin being shown in Fig. 3 and numbered 27, while the pie therein is numbered 28. Upon the vertical sleeves 21 and positioned by the upper ends of the shafts 22 are circular holding-frames 29 which receive the circular frames 24 and are formed with a vertical circular side flange 30 and, exterior thereto, with a downwardly and inwardly curved flange 31 between which and the flange 30 is formed a circular trough 32 adapted to receive the trimmings of the pie crust which may be removed and allowed to fall from the edge of the pie tin 27 and over the frame 24. The frame 24 is provided with an annular shoulder 33 which is directly over the upper edge of the circular flange 30 of the frame 29, as shown in Fig. 3, and the upper outer side edges of the frame 24 are on the same vertical plane as said flange 30, thus leaving a clear space for the descent of the pie crust trimmings to the circular trough 32. Each vertical shaft 22 carries a gear-wheel 23 and supporting frame 24, and each shaft 22 has a bearing in a sleeve 21 carried by a cross-bar 20 of the chains 12, and upon the top of each sleeve 21 is seated a carrying-frame 29, all as more particularly illustrated in Figs. 3 and 4.

The chains 12 have a continuous traveling movement imparted to them from the motor 19 and at suitably spaced apart intervals carry the cross-bars 20, vertical shafts 22 and frames 24, 29. Through a definite portion of the line of travel of the chains 12, the shafts 22 are given a rotary motion so as to effect the rotation of the frames 24 and pies carried thereby, this being for the purpose of coöperating with other features in trimming off the edges of the pie crust. The means for effecting the rotation of the shafts 22 while said shafts are passing a definite location, consists of a rack-bar 34 secured to the table 10 at about the middle of one side section thereof, as shown in Figs. 2, 3 and 4, said rack-bar 34 being limited in length and being projected inwardly below the open space 35 formed between the two side sections 36, 37 of the table 10. During the travel of the chains 12, the gear-wheels 23 are successively carried into mesh with the rack-bar 34 and during the travel of the chains along the length of said bar, the gear-wheels 23 roll against said bar and are rotated thereby and impart their movement to the shafts 22 and frames 24. The rotation of the shafts 22 and pie supporting frames 24 is thus only effected during the travel of the gear-wheels 23 along the rack-bar 34, and during all of the other portions of the travel of the chains 12 no rotary movement is imparted to the shafts 22 or frames 24.

At a suitable point along the length of the table 10, and with due relation to the rack-bar 34, is mounted, upon the table, a transverse frame composed of opposite side members 38, 39 of inverted U-formation, having ends 40, 41 and a top connecting bar 42, and the ends 40 being connected by a bar 43, while the ends 41 are connected by a corresponding bar 44. The frame thus composed is rigidly mounted on the table 10 and straddles the space 35 separating the two longitudinal sections 36, 37 thereof, and said frame is utilized to support the trimming rollers 45, 46 which are parallel with each other and extend longitudinally above the other sections of the table 10, as shown more clearly in Fig. 3. The rollers 45, 46 are suspended by pairs of bars 47, 48 from shafts 49, 50, respectively, which are mounted in bearings 51 secured upon the top-bars 42 of the frames 38, 39, said shafts 49, 50 being extended longitudinally of the table 10 and suitably above the same to support the hanger bars 47, 48, rollers 45, 46 and hoppers 52, 53, which may be of sheet metal and are open at their upper ends and at their lower ends are closed against the upper surfaces of the rollers 45, 46, said lower ends being open so that a portion of the surfaces of the rollers may rotate within them and also so that the inner lower edges of said hoppers, as at 54, may serve as scrapers for removing any surplus flour therefrom during their rotation toward the pie tin 27. The hoppers 52, 53 will contain a quantity of loose flour 55 so as to keep the rollers 45, 46 dusted therewith and avoid thereby any special sticking of the rollers to the dough of the pie crust. The lower outer edges of the hoppers 52, 53 may serve as scrapers, as at 56, to prevent any particles of dough from being carried upwardly over the rollers 45, 46. The hoppers 52, 53 are secured to cross-bars 57, 58 connected at their ends with the suspended bars 47, 48, respectively, (Figs. 6 and 7), and said hoppers are pivotally connected with rods 59, 60, respectively, which extend outwardly through free openings in the connecting bars 43, 44 and have upon them between said bars 43, 44, respectively, and the hoppers, coiled springs 61. The outer ends of the rods 59, 60 are threaded and receive thumb-nuts 62 which I utilize through the rods 59, 60 to adjust the initial relation of the hanging bars 47, 48, rollers 45, 46 and hoppers 52, 53 to the pie supporting frame 24. The springs 61 permit the bars 47, 48 and rollers 45, 46 to yield outwardly in a direction from each other, thus permitting the rollers 45, 46 to adjust themselves to the rim of the pie tin 27 and to yieldingly press against the edge of said tin in trimming the pie-crust dough therefrom. The rollers 45, 46 are power driven and rotate in a direction toward each other, and hence carry their surfaces downwardly against the rim of the pie tin 27, as indicated by the arrows in Fig. 3. The rollers 45, 46 primarily receive their motion from a sprocket-wheel 63 secured on the driving shaft 16 and connected by a chain 64 with a small sprocket wheel 65 secured on a shaft 66 carrying a belt wheel 67. The belt wheel 67 is connected by a twisted belt 68 with a belt wheel 69 secured on an extended portion of the shaft 50 from which the bars 48 are suspended. The shaft 50 has secured upon it a sprocket-wheel 70, and this sprocket-wheel is connected by a chain 71 with a small sprocket-wheel 72 on a reduced end portion 73 of the roller 46. Motion is transmitted to the roller 46 from the shaft 50 through the chain 71 and said roller turns counter-clockwise, as indicated by the arrow in Fig. 3. The roller 45 must turn clockwise and it receives its motion from the shaft 50 through the gearing which will now be referred to. On the shaft 50 is a gear-wheel 74 which is in mesh with a gear-wheel 75 and imparts motion thereto, and on the shaft of the gear-wheel 75 is a sprocket-wheel 76 connected by a chain 77 with a sprocket wheel 78 on the shaft 49 and motion is imparted to said shaft 49 from said chain 77. Upon the shaft 49 is mounted the larger sprocket-wheel 79 and from this wheel a chain 80 extends to a small sprocket-wheel 81 on a reduced end portion 82 of the roller 45, as shown in Fig. 2. The rotation of the roller 45 from the chain 80 results in said roller being turned counter-clockwise as noted by the arrow in Fig. 3. The gearing hereinbefore described for driving the rollers 45, 46 is unimportant in its detail and may be modified at will, the only purpose of the gearing being to positively reversely rotate the rollers 45, 46 so that they may have their surfaces moved downwardly at opposite sides of and against the rim of the pie-crust for trimming the same at the tin 27 while said tin, carrying the pie, is traveling between the rollers 45, 46 and is at the same time being rotated due to the engagement of the pinion-wheel 23 with the rack-bar 34. I have found that the horizontal rollers 45, 46 turned oppositely and toward each other, one clockwise and the other counter-clockwise, are of very great efficiency in trimming the pie-crust on a pie carried between them and while moving between them rotated, so that all portions of the edge of the pie, at the rim of the tin 27, may be engaged by said rollers. The rollers 45, 46 at their forward ends are tapered, as at 83, to facilitate the entrance of the pies between said rollers. I provide the table sections 36, 37, at their inner edges, with angle irons 84 for supporting and guiding the upper reaches of the chains 12.

When the machine is in operation, the chains 12 have a continuous traveling movement and carry the shafts 22, gear-wheels 23, frames 29 and pie-supporting frames 24. When the frames 24 appear at the top of the right hand end of the table 10, looking at Figs. 1 and 2, the pies are inserted within said frames 24, and as the chains continue to travel the pies are carried, one after another, between and against the rollers 45, 46, and while passing between said rollers are rotated; the action of the rollers 45, 46 is to trim the edges of the pie-crust, and this they do efficiently. After the pie holding frames 24 pass to the left beyond the rollers 45, 46, the pies may be lifted from the frames 24 and disposed of in any suitable manner. The rollers 45, 46 have a constant rotation and yieldingly press against the rim of the pie and its tin or pie-plate and remove all of the surplus crust from the pie, the removed particles falling into the circular troughs 32, which will empty themselves when they turn downwardly over the rear end of the machine. The trimming off of the pie-crust is performed during a short travel of the pie, this action taking place while the pie is moving between the rollers 45, 46. The rollers 45, 46 by rotating to carry their surfaces downwardly against the rim of the pie-tin at opposite sides of the tin exert a balanced pressure against said tin, and hence all tilting of the pie under treatment is avoided.

By employing two opposite rollers 45, 46 the pie may be trimmed during a very short travel thereof and in addition the down pressure of one roller is balanced by the down pressure of the other roller, whereby the pie is prevented from tilting while under treatment, and hence in the preferred embodiment of my invention I shall employ the two parallel rollers. I am aware, however, that with less advantage the pie-crust may be trimmed with the use of one of my rollers, and hence I do not in every instance wish to limit my invention to the use of the two rollers. Neither do I limit my invention to all of the details of mechanism hereinbefore described, since such details may obviously be modified without departure from my invention as defined in the claims.

What I claim as my invention and desire to secure by Letters Patent, is:

1. In a machine of the character described, a support for a pie-tin, means for effecting the travel of said support along a fixed path, means for rotating said support about its vertical axis during the travel thereof, a roller at one side of the line of travel of said support and means for rotating said roller downwardly against the edge of the pie-tin during the travel and rotation of said support, for trimming the pie-crust.

2. In a machine of the character described, a support for a pie-tin, means for effecting the travel of said support along a fixed path, means for rotating said support about its vertical axis during the travel thereof, rollers at the sides of the line of travel of said support and means for rotating said rollers in a direction toward each other and downwardly against opposite edges of the pie-tin during the travel and rotation of said support, for trimming the pie-crust.

3. In a machine of the character described, a support for a pie-tin, means for effecting the travel of said support along a fixed path, means for rotating said support about its vertical axis during the travel thereof, a roller at one side of the line of travel of said support and means for rotating said roller downwardly against the edge of the pie-tin during the travel and rotation of said support, for trimming the pie-crust, said roller being horizontal and having a tapered forward end and being yieldingly pressed against the edge of said tin.

4. In a machine of the character described, a support for a pie-tin, means for effecting the travel of said support along a fixed path, means for rotating said support about its vertical axis during the travel thereof, rollers at the sides of the line of travel of said support and means for rotating said rollers in a direction toward each other and downwardly against opposite edges of the pie-tin during the travel and rotation of said support, for trimming the pie-crust, said rollers being horizontal and having tapered forward ends and being yieldingly pressed against the edges of said tin.

5. In a machine of the character described, a support for a pie-tin, means for effecting the travel of said support along a fixed path, means for rotating said support about its vertical axis during the travel thereof, a roller at one side of the line of travel of said support, a hopper for loose flour over said roller and serving to supply flour to the surface thereof, and means for rotating said roller downwardly against the edge of the pin-tin during the travel and rotation of said support, for trimming the pie-crust.

6. In a machine of the character described, a support for a pie-tin, means for effecting the travel of said support along a fixed path, means for rotating said support about its vertical axis during the travel thereof, rollers at the sides of the line of travel of said support, hoppers for loose flour over said rollers and serving to supply flour to the surface thereof, and means for rotating said rollers in a direction toward each other and downwardly against the opposite edges of the pie-tin during the travel and rotation of said support, for trimming the pie-crust.

7. In a machine of the character described, a support for a pie-tin, rollers at opposite sides of said tin for engaging the same and trimming the pie-crust, means for rotating said support to carry the edge of said tin on a circular path against said rollers, and means for rotating said rollers on their longitudinal axes in a direction toward each other and downwardly against opposite edges of the pie-tin during the rotation of said tin.

8. In a machine of the character described, a support for a pie-tin, a roller at the side of said tin for engaging the same and trimming the pie-crust, means for rotating said support on its vertical axis to carry the edge of said tin on a circular path against said roller, and means for rotating said roller on its longitudinal axis downwardly against the edge of the pie-tin during the rotation of said tin.

9. In a machine of the character described, a support for a pie-tin, means for effecting the travel of said support along a fixed path, means for rotating said support about its vertical axis during a portion of the travel thereof, rollers at the sides of the line of travel of said support, swinging frames supporting said rollers, springs yieldingly pressing said rollers in a direction toward each other to cause them to yieldingly engage opposite edges of a pie-tin carried between them and means for rotating said rollers on their longitudinal axes in a direction toward each other and downwardly against opposite edges of the pie-tin during the travel and rotation of said support, for trimming the pie-crust.

10. In a machine of the character described, a support for a pie-tin, means for effecting the travel of said support along a fixed path, means for rotating said support about its vertical axis during a portion of the travel thereof, rollers at the sides of the line of travel of said support, swinging frames supporting said rollers, springs yieldingly pressing said rollers in a direction toward each other to cause them to yieldingly engage opposite edges of a pie-tin carried between them, hoppers for loose flour carried by said frames and having said rollers positioned in their lower open ends for keeping said rollers dusted with flour and means for rotating said rollers on their longitudinal axes in a direction toward each other and downwardly against opposite edges of the pie-tin during the travel and rotation of said support, for trimming the pie-crust.

11. In a machine of the character described, a pair of endless conveyer chains having and carrying a series of independent supports for pie-tins mounted to rotate on their vertical axes, means for effecting the travel of said conveyer, means for successively rotating said supports during a portion of the travel thereof, rollers at the sides of the line of travel of said supports and having outwardly diverging surfaces at their forward or entrance ends, and means for rotating said rollers on their longitudinal axes in a direction toward each other and downwardly against opposite edges of the pie-tins during the travel and rotation of the successive supports between them, for trimming the pie-crust.

12. In a machine of the character described, a pair of endless conveyer chains having and carrying a series of independent supports for pie-tins mounted to rotate on their vertical axes, means for effecting the travel of said conveyer, means for successively rotating said supports during a portion of the travel thereof, circular open-top troughs carried with said supports and extending outwardly beyond the sides of the same to receive the pie-crust trimmings, rollers at the sides of the line of travel of said supports and having outwardly diverging surfaces at their forward or entrance ends, and means for rotating said rollers on their longitudinal axes in a direction toward each other and downwardly against opposite edges of the pie-tins during the travel and rotation of the successive supports between them, for trimming the pie-crust.

Signed at New York city, in the county of New York and State of New York, this 30th day of December, A. D. 1920.

JOHN J. LINDEN.